Figure 1:
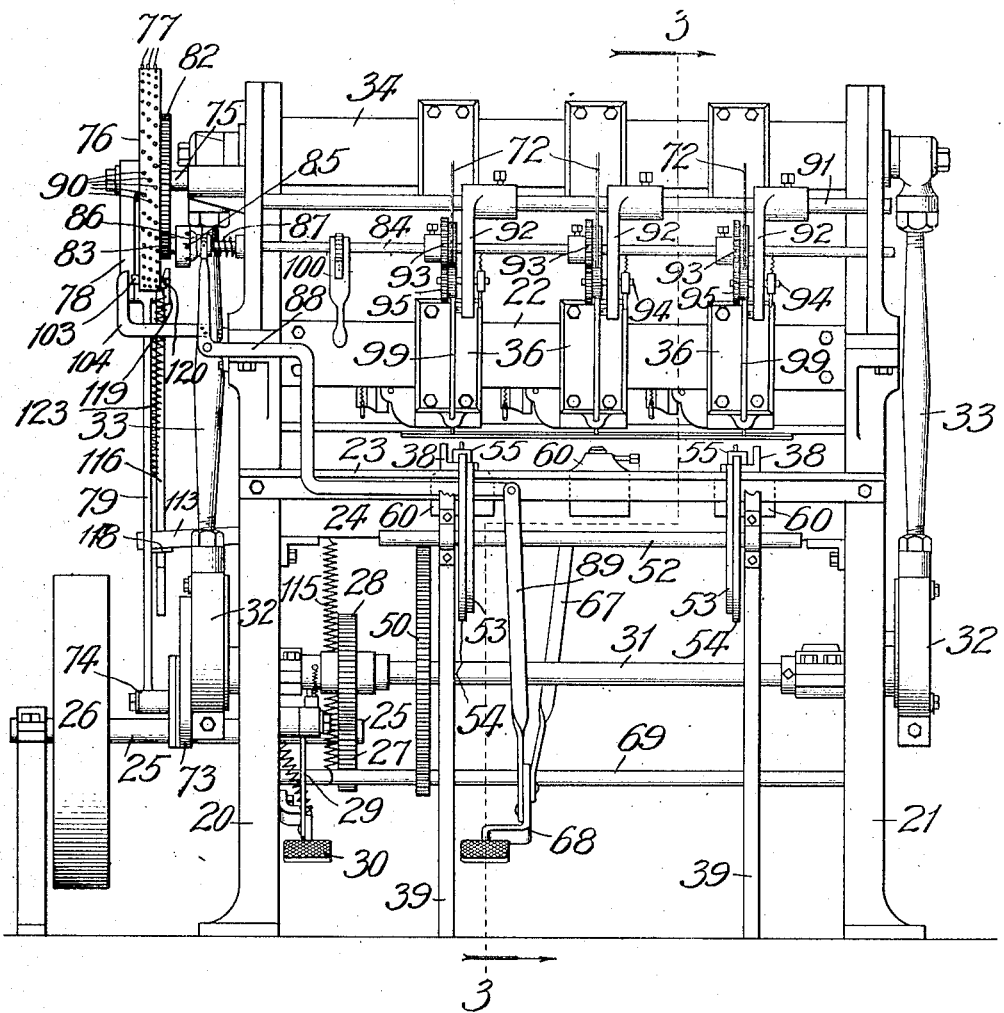

R. G. INWOOD.
MACHINE FOR MAKING WIRE BOUND BOX BLANKS.
APPLICATION FILED SEPT. 14, 1908.

913,958.

Patented Mar. 2, 1909.
6 SHEETS—SHEET 1.

Witnesses:
John Enders
Chas. H. Buell.

Inventor:
Richard G. Inwood,
By Dyrenforth, Lee, Chritton & Wiles
Attys.

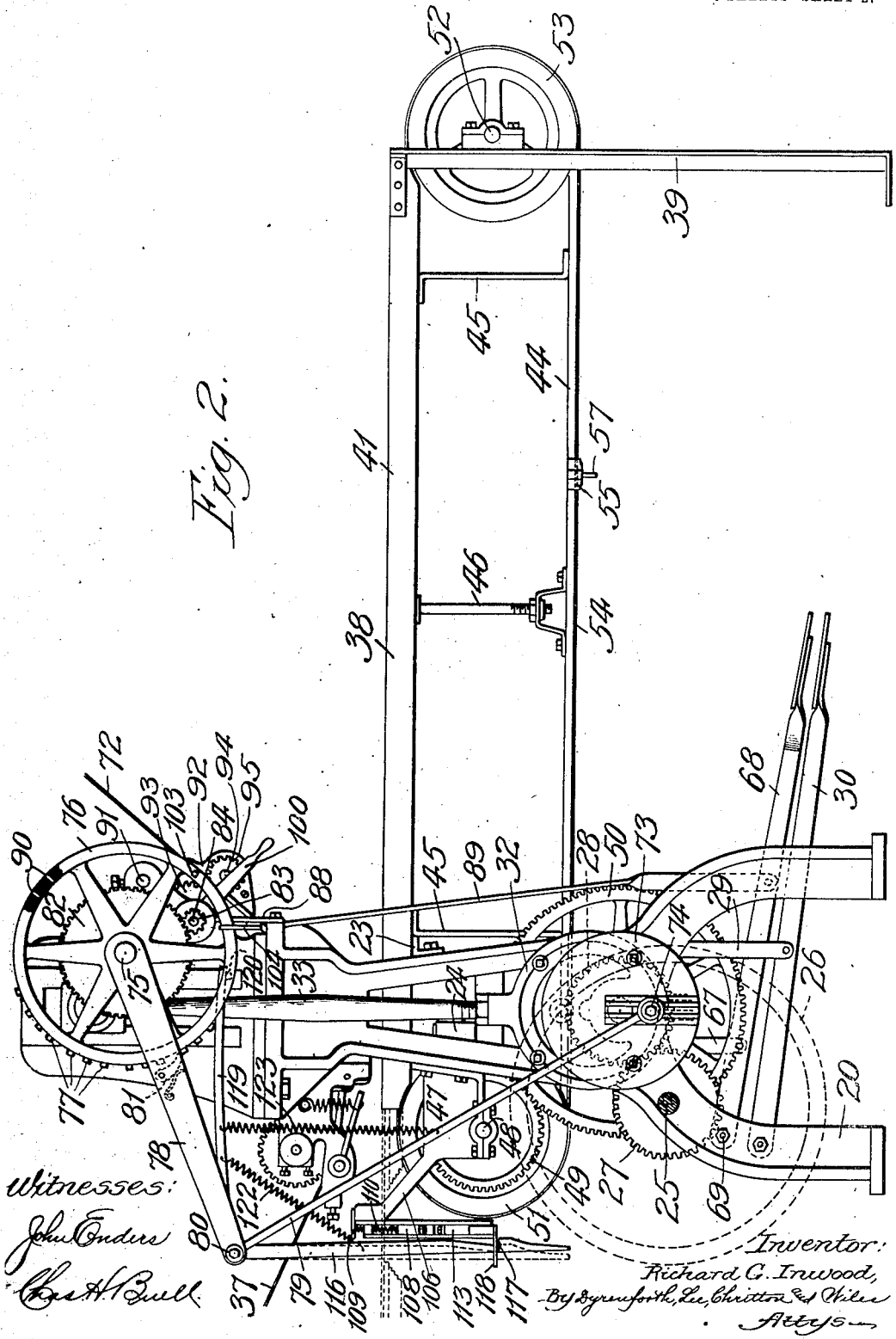

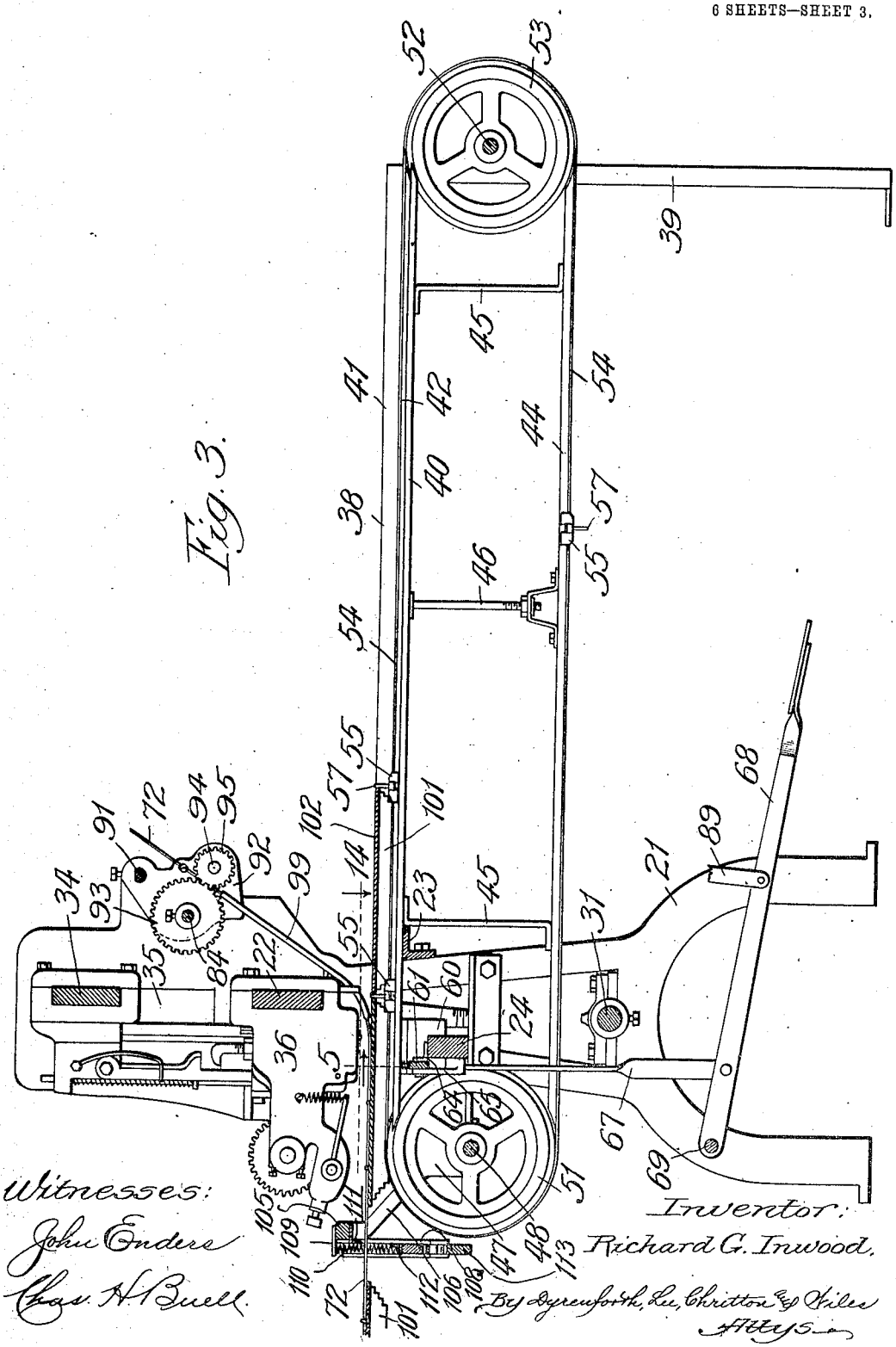

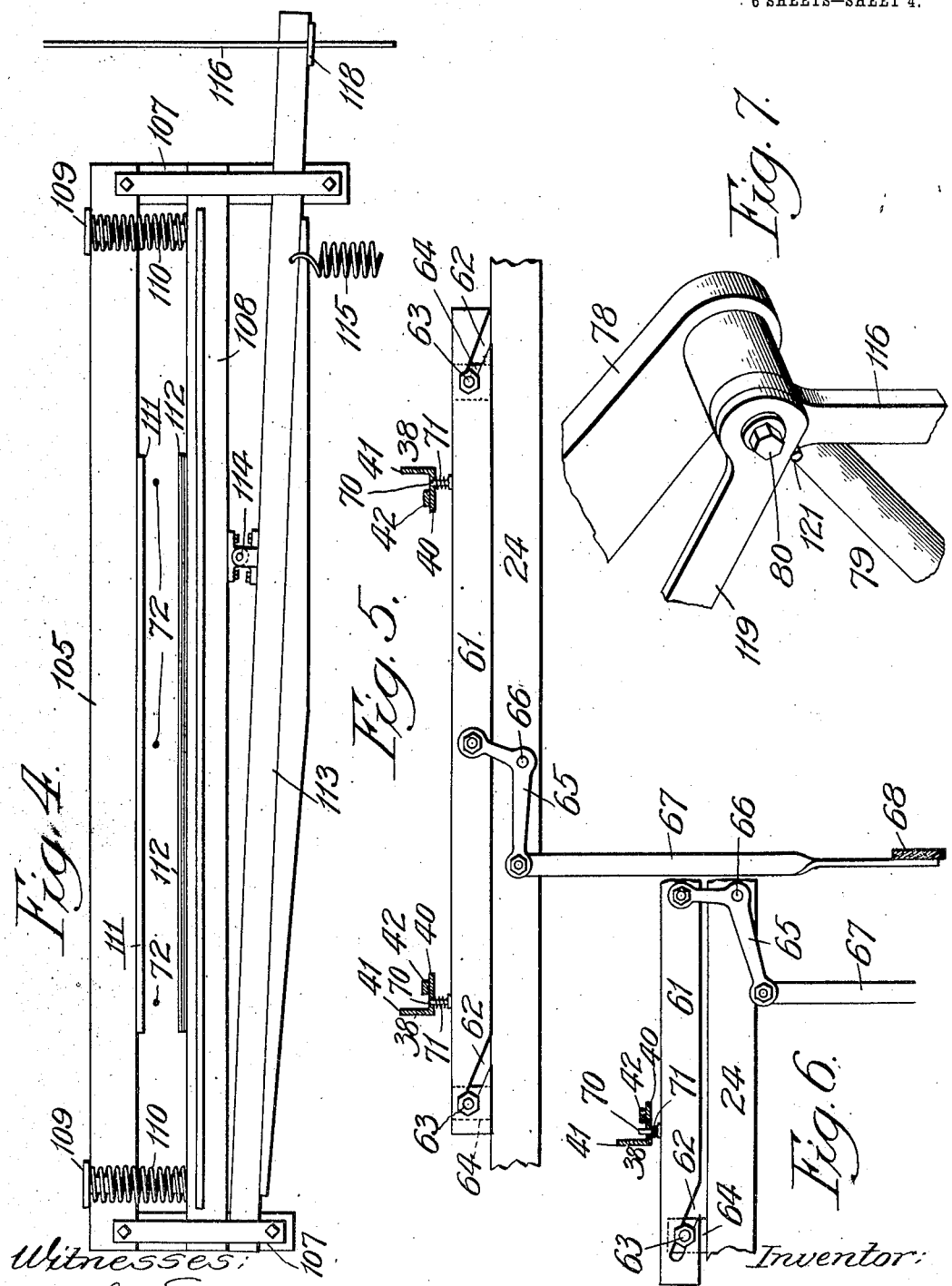

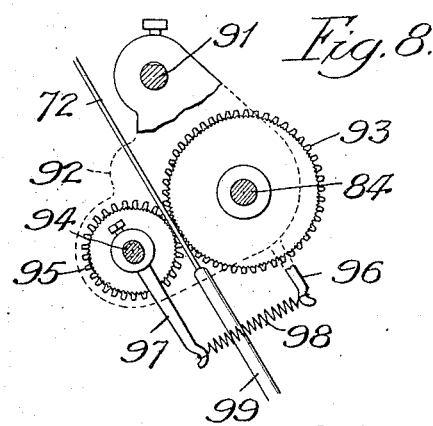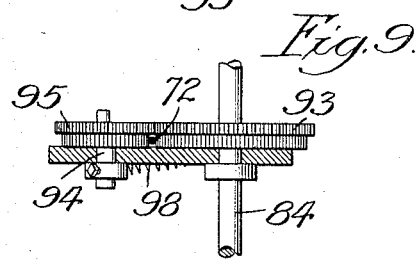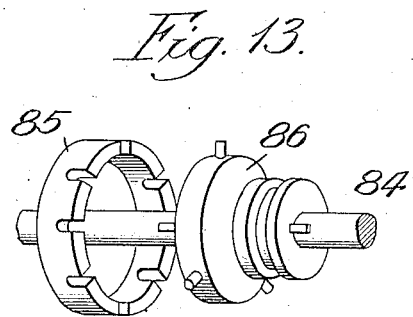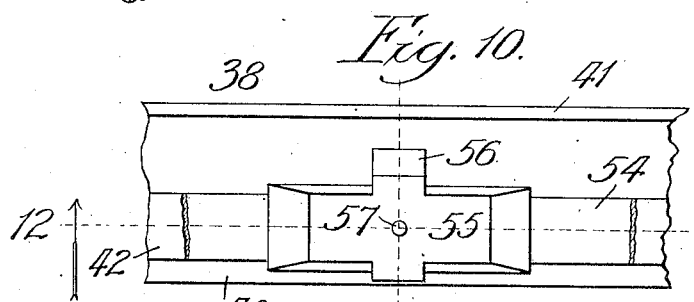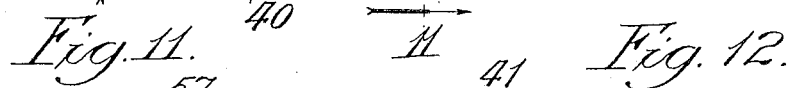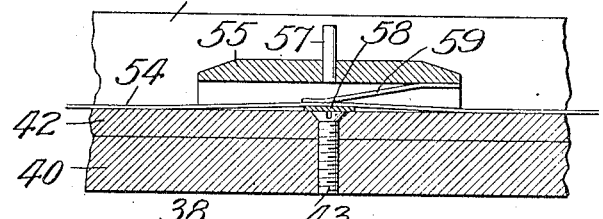

R. G. INWOOD.
MACHINE FOR MAKING WIRE BOUND BOX BLANKS.
APPLICATION FILED SEPT. 14, 1908.
913,958.
Patented Mar. 2, 1909.
6 SHEETS—SHEET 6.
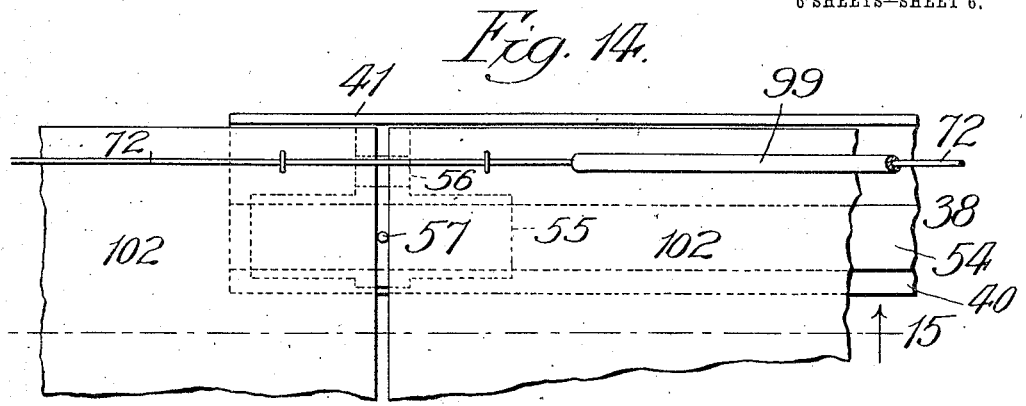
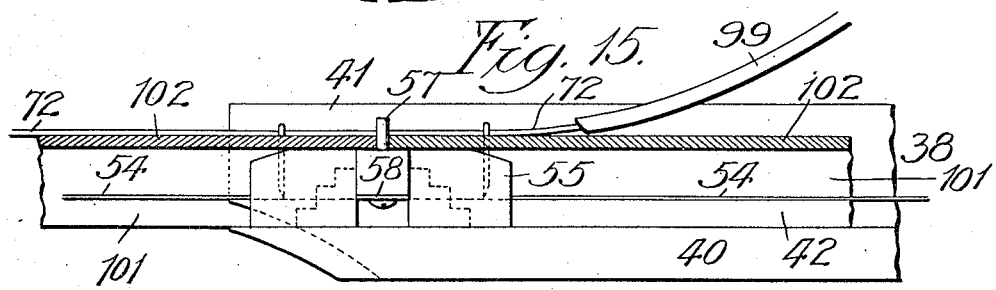
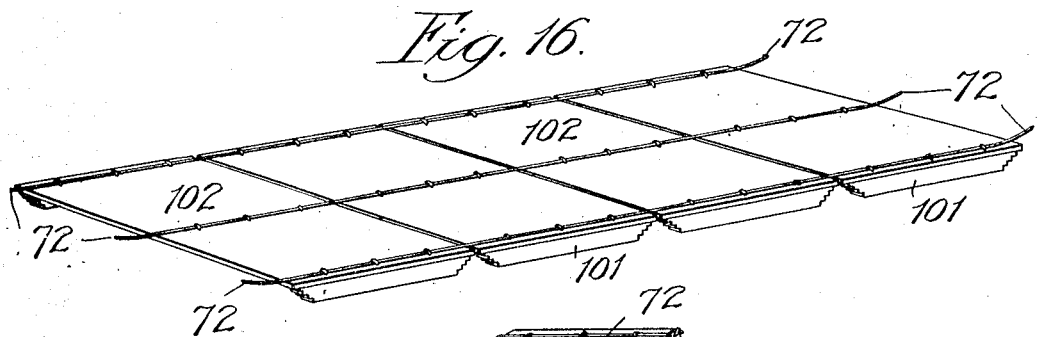
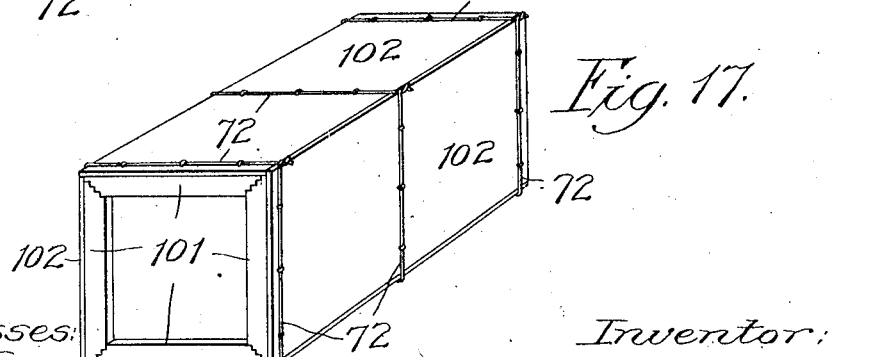
Witnesses:
John Enders
Chas. H. Buell
Inventor:
Richard G. Inwood,
By Dyrenforth, Lee, Chritton & Wiles
Attys

UNITED STATES PATENT OFFICE.

RICHARD GREENE INWOOD, OF SOUTH BEND, INDIANA, ASSIGNOR TO NATIONAL WIRE BOUND BOX COMPANY, OF SOUTH BEND, INDIANA, A CORPORATION OF INDIANA.

MACHINE FOR MAKING WIRE-BOUND BOX-BLANKS.

No. 913,958.            Specification of Letters Patent.        Patented March 2, 1909.

Application filed September 14, 1908. Serial No. 452,911.

*To all whom it may concern:*

Be it known that I, RICHARD GREENE INWOOD, a citizen of the United States, residing at South Bend, in the county of St. Joseph and State of Indiana, have invented a new and useful Improvement in Machines for Making Wire-Bound Box-Blanks, of which the following is a specification.

This invention relates to improvement in machines for making box-blanks of the general type described and claimed in Reissue Letters Patent No. 12,725, granted to National Wire Bound Box Company November 26, 1907; the present invention being in the nature of an improvement upon the new and simplified type of machines of this class shown, described and claimed in application Serial No. 401,522, filed November 9, 1907, by myself and Chester C. Chapman jointly.

My objects are, more, especially, to provide improved mechanism for facilitating the feeding of assembled blank-material into the machine, and to provide readily adjustable mechanism for regulating with desired accuracy the spacing apart of the staples along the blanks.

It is further my object to provide certain improvements in details of construction, all with a view to rendering the machine particularly strong, durable and efficient for its purpose.

Referring to the drawings—Figure 1 is a front elevation of the machine; Fig. 2, a side elevation of the machine with the driving-pulley indicated by dotted lines; Fig. 3, a section taken on irregular line 3—3 in Fig. 1; Fig. 4, an enlarged broken elevation of binding-wire severing-mechanism at the rear end of the machine; Fig. 5, an enlarged broken detail elevation taken at line 5 in Fig. 3, showing stop-mechanism, in its lowered position, for positioning the first cleats of a box-blank; Fig. 6, a broken view illustrating the parts shown in Fig. 4 in their raised position; Fig. 7, an enlarged broken perspective view of a detail of the construction; Fig. 8, an enlarged, broken sectional-view illustrating the construction of the binding-wire feed-wheels; Fig. 9, a broken plan-section of the same; Fig. 10, an enlarged broken plan-view illustrating one of a plurality of friction-propelled spacing-blocks; Fig. 11, a section taken on line 11 in Fig. 10; Fig. 12, a section taken on line 12 in Fig. 10; Fig. 13, a broken perspective view of a clutch on the shaft carrying the feed-wheels; Fig. 14, an enlarged broken fragmentary plan-section taken on line 14 in Fig. 3; Fig. 15, a section taken on line 15 in Fig. 14; Fig. 16, a perspective view of a completed box-blank; and Fig. 17, a perspective view of a box formed from the box-blank.

The main frame of the machine consists of the usual sides, or cheeks, 20 and 21 held together by the stationary cross-bars 22, 23 and 24 (shown in cross-section in Fig. 3) as well as by shafts hereinafter described.

A short shaft 25 journaled in the cheek 20, carries a constantly rotating drive-pulley 26 and gear-wheel 27. The gear-wheel 27 engages a gear-wheel 28 normally loose on the main shaft 31. Interposed between the gear-wheel 28 and shaft 31 is a normally open clutch which may be closed to cause the said gear-wheel to rotate the shaft. The clutch is of common construction and is actuated by a stem connected through a link 29 with the foot-lever 30. While pressure is exerted upon the foot-lever the clutch-members engage and the shaft 31 is rotated, and when said pressure is released the clutch-members will disengage and cause the shaft 31 to stop at a point marking the completion of a revolution, as hereinafter explained. The shaft 31 carries eccentrics 32 connected by pitmen 33 with a cross-head 34 reciprocating in guides 35 in the cheeks. The usual staple-forming and driving devices 36 are fastened to the bar 22 and actuated from the cross-head 34 to form staples from the wires 37 and drive them in each down-stroke of the cross-head. The stapling-devices, or stitchers, are relatively adjustable along the bar 22 and cross-head 34, as usual.

An adjustable feed table is formed with upper parallel guides 38 resting at their outer ends on legs 39 and toward their inner ends upon the bar 23 to extend beneath the two outer stitchers 36. The guides 38 are constructed as shown in Fig. 11 and consist of a flat bar 40, side-strip 41 and narrow strip, or track, 42 fastened to the bar 40 by the screws 43. Beneath and parallel with the guides 38 are guide-strips, or tracks, 44 of the same size and shape in cross-section as the tracks 42. The strips 44 are slightly flexible and held in rigid relation to the guides 38 by hangers, or brackets, 45. Between the hangers 45 the strips 44 are connected to the guides 38 by means of adjusting bolts 46. Journaled at opposite ends in brackets 47 on the cheeks 20, 21 is a shaft 48 carrying a gear-wheel 49 meshing with a gear-wheel 50 on the shaft 31. The shaft 48 carries a pair of relatively adjustable wheels 51 having peripheral portions of the same width as the guide-strips 42, 44. The wheels 51 are adjusted to register with the ends of the said guide-strips as indicated in Fig. 3. Journaled on the legs 39 is a shaft 52 carrying wheels 53 constructed like the wheels 51 and registering, as indicated, with the guide-strips 42, 44. Stretched around each pair of wheels 51, 53 is an endless metal ribbon, or tape, 54 which may be a flexible medium of any suitable construction, and which between the wheels slides along the upper surface of the track 42 and the under surface of the track 44. They are propelled by the wheels 51, and may be tensioned by turning the nuts on the bolts 46 to bend down the guide-strips 44. Each tape 54 carries a plurality of spacing-members, or spacer-blocks, 55 for use in spacing apart, and thus positioning with relation to each other, the cleats and sheets forming successive sections of a box-blank. Each spacer-block is bifurcated longitudinally to straddle the guides 42, 44 and the peripheries of the wheels 51, 53. Removably attached to the inner side of each block is a plate, or lug, 56 to engage the ends of cleats and push them along in the guides 38. Projecting upward from the top of each block is a pin, or stop, 57 for engaging and positioning, with relation to each other, the sheets of the blank. At the center of each block, and fastened thereto from the underside by screws, is a cross-plate 58 forming a shoulder to travel over the surfaces of the guide-strips 42, 44 and wheels 51, 53. The tapes 54 pass through the blocks 55 over the plates, or shoulders, 58 as indicated in Figs. 11 and 12, and each block contains a finger-spring 59 which presses upon the tape, thus yieldingly clamping the latter between the spring and plate 58. The blocks are thus frictionally engaged by the tapes 54 to travel therewith, but sufficient pressure applied to the blocks will slide them longitudinally upon the tapes.

The bar 24 supports three relatively adjustable anvils 60 which are positioned beneath the staple-driving rams of the stitchers 36. The two outer anvils contact with the under surfaces of the guides 38 and the intermediate anvil has a raised portion to take the thrust and clench the staples which fasten the central longitudinal binding-wire 72 of the blank.

When the first pair of cleats and sheet of the blank are placed in the machine they must be positioned relative to each other and the staple-drivers, so that the first staples will be driven the proper predetermined distance from the end of the blank. Adjacent to the bar 24 is a movable bar 61 having inclined slots 62 (Figs. 5 and 6) at which it slides upon guide-bolts 63 fastened to brackets 64 on the bar 24. Fulcrumed on the bar 24, at 66, is a bell-crank lever 65 pivotally connected at the end of its short arm with the center of the bar 61, and connected at the end of its long arm by means of a link 67 with a foot-lever, or treadle, 68 which is fulcrumed upon a rod, or shaft, 69. Extending through openings in the bases 40 of the guides 38, above the bar 61, are stop-pins 70 having heads which rest upon the bar 61. Confined between said heads and the under surfaces of the guides 38 are springs 71 which tend normally to press the pins downward. Downward pressure on the foot-lever 68 turns the bell-crank lever 65 to thrust the bar 61 longitudinally and upward on the guide-bolts 63 and raise the stop-pins 70 simultaneously to the position indicated in Fig. 6, whereby they are in the paths of the cleats.

The intermittent feeding of the blanks beneath the stitching-devices is performed by the thrust of the binding-wires 72, the length of the thrust in each instance being the distance apart of the points at which staples are to be driven in forming the blank. On one end of the shaft 31 is a disk 73 having a radial guide-slot in which a block is adapted to slide and be secured at varying degrees of eccentricity. The block carries a wrist-pin 74. Journaled on a stub-shaft 75 extending from the cheek 20 is a wheel 76 in the nature of a ratchet-wheel of special construction. This wheel is provided with adjustable teeth 77. In the construction illustrated, the peripheral face of the wheel is provided with a series of holes, or tooth-seats, 90, to receive the studs 77 which constitute the teeth of the ratchet-wheel. In practice, the holes may be positioned as indicated in Fig. 1 so that they will be, say, in transverse lines, about three-eighths of an inch apart around the periphery of the wheel. Fulcrumed at one end upon the shaft 75 is a lever 78. A pitman 79 is connected at one end to the wrist-pin 74 and at its opposite end to a pin, or bolt, 80 on the free end of the lever 78. The lever carries a spring-pawl 81 adapted to engage the teeth 77 on the wheel 76. Integral with the wheel 76 is a gear-wheel 82 engaging a pinion 83 on a shaft 84, which latter extends across the machine and is journaled in the cheeks 20, 21. The pinion 83 is normally loose on the shaft 84 and is joined to a clutch-member 85 on said shaft (see Fig. 13). 86 is a companion clutch-member feathered upon the shaft 84 and adapted to be slid out of engagement with the clutch member 85 against the resistance of a spring 87 by means of a bell-crank lever 88 which is connected by a link 89 with the foot-lever 68. Adjustably fastened upon a stationary rod, or shaft, 91 are three brackets, or hangers, 92 having openings through them fitting around the shaft 84. Fastened to the shaft 84 at the side of each bracket 92 is one of a pair of companion binding-wire feed-wheels 93 consisting of an integral gear-wheel and wire-engaging wheel or disk, provided with a milled or roughened periphery.

Journaled on each bracket is a rock-shaft 94 having a reduced eccentric portion (see Fig. 9) on which is journaled the other companion binding-wire feed-wheel 95, consisting of a gear-wheel portion, meshing with the gear-portion of the companion wheel 93, and a milled or roughened wire-engaging periphery. Each of the brackets 92 carries a stationary finger 96 (see Fig. 8) and fastened to each shaft 94 is a finger 97, the two fingers being connected by a spring 98. The tendency of the spring is to turn the shaft 94 in the direction of pressing the wheel 95 yieldingly in the direction of the wheel 93. Thus, the wheels 93, 95 will intermesh and clamp a binding-wire 72 between them, but will yield to accommodate themselves to unevenness in thickness of the wire. Extending from each bracket 92 to a position close to the path of the adjacent staple-driver is a wire-guiding tube 99. The shaft 84 carries a ratchet and swinging pawl 100 (see Fig. 1) by means of which the said shaft may be manually rotated.

To form a box-blank, the operator places the first two cleats 101 in the guides 38 behind a pair of blocks 55 so that they may slide between the guide-strips 42 and sides 41. He then presses down the foot-lever 68 to raise the stop-pins 70, places the first sheet 102 on the said cleats and slides them along the guides and tapes until the said blocks abut against the stop-pins 70 which have been raised by depressing said foot-lever. The first section of assembled blank-material is then in position to receive the first staples in proper location with reference to the forward edge of the blank. The operator then turns the shaft 84 (the clutch-members on which remain disengaged while said foot-lever is depressed) by means of the handle 100 to advance the binding-wires 72 sufficiently beyond the forward edge of the blank.

On the outer side of the wheel 76 is a stud 103, and on the bell-crank lever 88 is a bent finger 104 which in the depression of the foot-lever 68 is turned into the path of said stud 103. Before starting the machine and while depressing the foot-lever 68, the operator turns the wheel 76 until the stud 103 contacts with the finger 104. This locates the wheel 76 in its proper initial position. The teeth 77 are so positioned with relation to each other in the holes 90 in the face of the wheel 76 that, in the turning of the wheel 76 and parts driven thereby, the binding-wires will be fed in each up-stroke of the staple-drivers the distance that it is desired shall exist in each instance between staples. Thus, in the case of a blank such as shown in Fig. 16, wherein the binding-wires 72 are fastened to the sheets and cleats by three staples at each sheet-section, the teeth 77 are so positioned that the binding-wires and consequently the blank-material will be fed, in each up-stroke of the staple-drivers, so that staples will be driven at a proper distance from the ends of cleats and the intermediate staple midway between them; while in crossing from one blank-section to the next the feed may be increased more or less to avoid driving any staples too close to the step-mitered end-portions of cleats to interfere with the folding of the blank in the formation of a box. The distance of swing of the lever 78 and consequent throw produced by the pawl 81 may be regulated to regulate the feed of the binding-wires, by adjusting the block, which carries the wrist-pin 74, in the slot of the disk 73. The shaft 48 is rotated at a speed which will cause the tapes 54 to travel at regular speed and at a much faster rate than the intermittent movement of the binding-wires. The frictional engagement between the tapes and spacing-blocks 55 causes a pair of the blocks to move against the rear ends of the cleats of the first blank-section while the stitchers are operating on the latter. The tapes continuing to travel slide through the said pair of retarded blocks while maintaining them against the said blank-section.

After the first pair of cleats and sheet have been placed in the machine and positioned by the stop-pins 70, and the operator has advanced the binding-wires, by operating the ratchet 100, and has turned the wheel 76 to its initial position, all as described, he takes his foot off the lever 68 which causes the clutch-members on the shaft 84 to engage and the stop-pins 70 to descend to their lowered position. The machine is then ready to stitch the blank. To bring about this operation, the operator presses down the foot-lever 30 to cause the rotating gear-wheel 28 to clutch and rotate the shaft 31. It is to be understood that the clutch between the gear 28 and shaft 31 is so constructed that when the shaft 31 is unclutched and stops, the cross-head 34 is in its raised position. Clutches of this class are common in machines of this type. Thus when the machine is started as described, the cross-head will descend and the stitching devices will drive the first staples into the blank, thus fastening the binding-wires thereto. In the following up-stroke of the cross-head the binding-wire feed-wheels are rotated through the medium of the connecting-rod 79, lever 78, ratchet-wheel 76 and the gear connection between the latter and the shaft 84. While the binding wires are being fed, the fact of their passing through the guide-tubes 99 prevents them from buckling and causes them to thrust ahead and thus feed the blank-section to which they are stapled.

While the first blank-section is being stitched, the operator places the second pair of cleats and second sheet in the guides 38 and the next pair of spacing-blocks on the traveling tapes engage the rear ends of these second cleats and sheet and force them into position against the spacing-blocks ahead. While the second blank-section is passing beneath the stitchers the material for the third section is placed in the guides and advanced to the spacer-blocks ahead by the spacing-blocks next following. The material for the fourth blank-section is positioned in the same way. When the last staples have been driven into the fourth blank-section, the operator takes his foot from the foot-lever 30 which causes the machine to stop with the cross-head 34, as before stated, in its elevated position. The operator then places his foot upon the lever 68, operates the ratchet 100 to force the finished blank ahead a sufficient distance to leave the desired stretch of binding-wires between blanks, turns the wheel 76 to its initial position and places in the guides the cleats and sheet for the first section of another blank, pushing them along until stopped by the elevated stop-pins 70, all as before described. Thus blanks may be formed successively with but short intervals between operations.

The following mechanism is provided for severing the binding-wires between blanks. 105 (see Fig. 4) is a stationary bar supported upon brackets 106 carried by the cheeks 20, 21. Suspended from opposite ends of the bar 105 are stirrup-guides 107 for a horizontal vertically movable bar 108. Confined between the bar 108 and brackets 109, on the bar 105, are springs 110 which tend normally to press the bar 108 downward in its guides. Secured against the under surface of the bar 105, above the path of the blanks, is a shearing-blade 111, and fastened upon the bar 106 below the path of the blanks is a companion shearing-blade 112. A lever 113 fulcrumed at its end in one of the guides 107 is pivotally connected between its ends, at 114, with the under side of the bar 108. A spring 115 tends normally to draw the lever 113 and consequently the bar 108 in the downward direction supplementing the action of the springs 110. Suspended from the bolt, or pin, 80, carried by the lever 78, is a bar 116 provided in its forward edge near its lower end with a notch presenting a shoulder 117. Along its lower end-portion the said bar slides in a stirrup-guide 118 on the lever 113. Also pivoted at its end upon the pin, or bolt, 80 is a rod 119 extending to the inner side of the wheel 76. On the said side of the wheel is a stud 120 into the path of which a bent end-portion of the rod 119 projects. The rod 119 rests near its pivot against a stud 121 on the bar 116, and the said rod and bar are yieldingly held in the relative positions shown by a connecting-spring 122. A spring 123 fastened at its lower end to the pitman 79 and at its upper end to the rod 119 tends normally to draw the latter downward upon the stud 121 and swing the bar 116 outward to the position indicated by dotted lines in Fig. 2. Normally in the up and down movement of the lever 78 the bar 116 will slide freely in the stirrup 118. When, however, in the turning of the wheel 76 the stud 120 moves against the under side of the bent end-portion of the rod 119, the latter is swung upward on its pivot away from the pin 121, thereby permitting the spring 122 to swing the bar 116 at its lower end-portion in the forward direction causing its shoulder 117 to engage the under side of the stirrup 118. In the next upward movement of the lever 78, therefore, the bar 116 will raise the lever 113 and cause the shears to sever the binding-wires. In the present machine, as illustrated, the shears operate while the third staples from the forward end of the box-blank are being driven, at which time the binding-wires register at points approximately midway between the blank-ends with the shears (see Fig. 3). Thus, after a blank has been stitched and as it passes from the machine it is severed from the following blank.

The lugs, or plates, 56 on the sides of the spacing-members may be removed and replaced with others, either longer or shorter, to increase or diminish the spacing apart of the cleats.

What I claim as new, and desire to secure by Letters Patent, is—

1. In a machine for making wire-bound box-blanks, the combination with stapling-mechanism and means for guiding the binding-wire upon the blank-material, of intermittently-operating binding-wire-thrusting feed-mechanism constructed to feed the blanks and provided with means adjustable to vary the distances between staples.

2. In a machine for making wire-bound box-blanks, the combination with stapling-mechanism and means for guiding the binding-wire upon the blank-material, of intermittently-operating binding-wire-thrusting feed-mechanism constructed to feed the blanks, including a member provided with intermittently driven mechanism adjustable to regulate the spacing of the staples.

3. In a machine for making wire-bound box-blanks, the combination with stapling-mechanism and means for guiding the binding wire upon the blank-material, of intermittently-operating binding-wire-thrusting feed-mechanism constructed to feed the blanks, including pawl-and-ratchet driving mechanism adjustable to regulate the spacing of the staples.

4. In a machine for making wire-bound box-blanks, the combination with stapling-mechanism and means for guiding the binding-wire upon the blank-material, of intermittently-operating binding-wire-thrusting feed-mechanism constructed to feed the blanks, including a pawl-driven ratchet-wheel provided with relatively adjustable teeth, for the purpose set forth.

5. In a machine for making wire-bound box-blanks, the combination with stapling-mechanism and means for guiding the binding-wire upon the blank-material, of intermittently-operating binding-wire-thrusting feed-mechanism constructed to feed the blanks, including a pawl-driven ratchet-wheel provided with tooth-seats about its periphery, and teeth removably insertible into said seats for spacing them at varying distances apart, for the purpose set forth.

6. In a machine for making wire-bound box-blanks, the combination with stapling-mechanism and means for guiding the binding-wire upon the blank-material, of intermittently-operating binding-wire-thrusting feed-mechanism constructed to feed the blanks, including a pawl-driven ratchet-wheel provided with relatively adjustable teeth, and means for varying the throw of the pawl, for the purpose set forth.

7. In a machine for making wire-bound box-blanks, the combination with guides for assembled blank-material, stapling-mechanism and feeding-means for advancing said material across said mechanism, of spacing-members for the blank-sections movable along said guides, and endless traveling tapes, frictionally engaging said members, for the purpose set forth.

8. In a machine for making wire-bound box-blanks, the combination with guides for assembled blank-material, stapling-mechanism and feeding-means for advancing said material across said mechanism, of wheels at opposite ends of said guides, endless tapes, extending longitudinally of said guides around said wheels, spacing-members for the blank-sections movable along said guides and frictionally engaging said tapes, and means for driving said tapes.

9. In a machine for making wire-bound box-blanks, the combination with guides for assembled blank-material, stapling-mechanism and feeding-means for advancing said material across said mechanism, of tracks below and parallel with said guides, wheels registering with opposite ends of said guides and tracks, endless tapes, extending longitudinally of said guides and tracks and around said wheels, spacing members for the blank-sections frictionally engaging said tapes to be moved thereby along said guides and upon said tracks and wheels, and means for driving said tapes.

10. In a machine for making wire-bound box-blanks, the combination with guides for assembled blank-material, of spacing-members for the blank sections movable along said guides, endless traveling tapes, extending through said members, and clamping-means on the members frictionally engaging said tapes, for the purpose set forth.

11. In a machine for making wire-bound box-blanks, the combination with guides for assembled blank-material, stapling-mechanism, and feeding-means for advancing said material across said mechanism, of endless tapes extending along said guides, means for moving the tapes continuously at higher speed than said feeding-means, and spacing members for the blank-sections frictionally engaging said tapes to be moved thereby along said guides, for the purpose set forth.

12. In a machine for making wire-bound box-blanks, the combination with a main shaft, equipped with starting and stopping clutch-mechanism, and stapling-devices actuated from said main shaft, of binding-wire-thrusting feed-wheels constructed to feed the blanks, an intermittently operated driving-wheel for said feed-wheels, actuated from said main shaft, a clutch between said driving-wheel and feed-wheels, a lever, shifting means for the said clutch operatively connected with said lever, positioning-stops for the blank-material adjacent the stapling-devices and means operatively connected with said lever for moving the said stops into the path of said material, for the purpose set forth.

13. In a machine for making wire-bound box-blanks, the combination with a main shaft equipped with starting and stopping clutch-mechanism, stapling-devices actuated from said main shaft, and guides for assembled blank-material, of movable positioning-stops for the blank-material on said guides adjacent the stapling-devices, binding-wire-thrusting feed-wheels constructed to feed the blanks, an intermittently operated driving-wheel for said feed-wheels actuated from said main shaft, a clutch between said driving-wheel and feed-wheels, and shifting-means for said clutch operatively connected with said positioning-stops, all so constructed and arranged that movement of said shifting-means in one direction releases the feed-wheels from their driving-wheel, whereby they may be turned independently, and moves the said positioning-stops into the path of said blank-material, for the purpose set forth.

RICHARD GREENE INWOOD.

In presence of—
 RALPH SCHAEFER,
 CHAS. E. GAYLORD.